(12) United States Patent
Barnes et al.

(10) Patent No.: US 9,732,267 B2
(45) Date of Patent: Aug. 15, 2017

(54) COMPOSITION FOR ENHANCED HYDROCARBON RECOVERY FROM A FORMATION

(71) Applicant: SHELL OIL COMPANY, Houston, TX (US)

(72) Inventors: Julian Richard Barnes, Amsterdam (NL); Marten Adriaan Buijse, Vogelenzang (NL); Marinus Cornelis Hendrikus Grutters, Amsterdam (NL); Robert Moene, Amsterdam (NL); Reinaldo Conrado Navarrete, Houston, TX (US); Thomas Carl Semple, Friendswood, TX (US); Andrew Granja Shepherd, Assen (NL)

(73) Assignee: SHELL OIL COMPANY, Houston, TX (US)

( * ) Notice: Subject to any disclaimer, the term of this patent is extended or adjusted under 35 U.S.C. 154(b) by 17 days.

(21) Appl. No.: 14/881,650

(22) Filed: Oct. 13, 2015

(65) Prior Publication Data
US 2016/0032171 A1    Feb. 4, 2016

Related U.S. Application Data

(62) Division of application No. 13/382,387, filed as application No. PCT/US2010/041044 on Jul. 6, 2010, now Pat. No. 9,187,688.

(60) Provisional application No. 61/224,321, filed on Jul. 9, 2009, provisional application No. 61/303,962, filed on Feb. 12, 2010.

(51) Int. Cl.
*C09K 8/584* (2006.01)

(52) U.S. Cl.
CPC .................................. *C09K 8/584* (2013.01)

(58) Field of Classification Search
None
See application file for complete search history.

(56) References Cited

U.S. PATENT DOCUMENTS

| 3,775,303 A | 11/1973 | McKinney et al. |
| 3,775,304 A | 11/1973 | McKinney et al. |
| 3,808,157 A | 4/1974 | Dewitt et al. |
| 4,029,608 A | 6/1977 | Murata et al. |

(Continued)

FOREIGN PATENT DOCUMENTS

| CA | 2702610 | 5/2009 |
| EA | 201070932 | 2/2011 |

(Continued)

OTHER PUBLICATIONS

Chatzis, I et al. "Correlation of Capillary Number Relationships for Sandstone"; SPE Journal, vol. 29; pp. 555-562; Oct. 1984.

(Continued)

*Primary Examiner* — John J Figueroa

(57) ABSTRACT

A hydrocarbon recovery composition which comprises a first blend of C24-28 internal olefin sulfonates and an injectable fluid composition comprising the hydrocarbon recovery composition, water and/or brine wherein the hydrocarbon recovery composition is present in an amount of from 0.05 to 1.0 wt % of the total injectable fluid composition can be used for enhanced hydrocarbon recovery from a formation.

18 Claims, 3 Drawing Sheets

(56) References Cited

U.S. PATENT DOCUMENTS

| | | | |
|---|---|---|---|
| 4,183,867 A | 1/1980 | Sekiguchi et al. | |
| 4,248,793 A * | 2/1981 | Sekiguchi | C07C 303/06 |
| | | | 562/123 |
| 4,488,976 A | 12/1984 | Dilgren et al. | |
| 4,537,253 A | 8/1985 | Morita et al. | |
| 4,549,607 A * | 10/1985 | Morita | C09K 8/584 |
| | | | 166/270.1 |
| 4,597,879 A | 7/1986 | Morita et al. | |
| 4,810,367 A | 3/1989 | Chombart et al. | |
| 4,979,564 A | 12/1990 | Kalpakci et al. | |
| 5,068,043 A | 11/1991 | Thigpen et al. | |
| 5,078,916 A | 1/1992 | Kok et al. | |
| 5,103,909 A | 4/1992 | Morgenthaler et al. | |
| 5,199,490 A | 4/1993 | Surles et al. | |
| 5,284,206 A | 2/1994 | Surles et al. | |
| 5,510,306 A | 4/1996 | Murray | |
| 5,633,422 A | 5/1997 | Murray | |
| 5,648,584 A | 7/1997 | Murray | |
| 5,648,585 A | 7/1997 | Murray | |
| 5,654,261 A | 8/1997 | Smith | |
| 5,849,960 A | 12/1998 | Singleton et al. | |
| 6,427,268 B1 | 8/2002 | Davis | |
| 6,439,308 B1 | 8/2002 | Wang | |
| 2002/0096453 A1 | 7/2002 | Zaki et al. | |
| 2007/0295640 A1 | 12/2007 | Tan et al. | |
| 2008/0171672 A1 | 7/2008 | Cano et al. | |
| 2009/0149356 A1 * | 6/2009 | Tiwari | C07D 233/16 |
| | | | 507/243 |
| 2009/0151941 A1 | 6/2009 | Dwarakanath et al. | |
| 2009/0203557 A1 | 8/2009 | Barnes et al. | |
| 2009/0203558 A1 * | 8/2009 | Barnes | C09K 8/58 |
| | | | 507/277 |

FOREIGN PATENT DOCUMENTS

| | | |
|---|---|---|
| EA | 201070933 | 4/2011 |
| EP | 0351928 | 1/1990 |
| EP | 0830315 | 9/1999 |
| GB | 2135713 | 9/1984 |
| GB | 2137676 | 10/1984 |

OTHER PUBLICATIONS

Falls, A.H. et al.: "Field Test of Cosurfactant-Enhanced Alkaline Flooding"; SPE Reservoir Engineering; pp. 217-223; Aug. 1994.
Roberts, D.W.; "Why Internal Olefins are Difficult to Sulphonate"; Tenside Detergents (22) 4; pp. 193-195; 1985.
Barnes, J. et al., "Development of Surfactants for Chemical Flooding at Difference Reservoir Conditions", Shell Global Solutions, SPE/DOE Improved Oil Recovery Symposium, Tulsa, OK 2008, SPE113313, pp. 1-18.

* cited by examiner

COMPOSITION FOR ENHANCED HYDROCARBON RECOVERY FROM A FORMATION

PRIORITY CLAIM

The present application is a divisional of U.S. Nonprovisional Ser. No. 13/382,387, filed Jan. 5, 2012, which is a National Stage (§371) of International Application No. PCT/US2010/041044, filed Jul. 6, 2010, which claims the benefit of U.S. Provisional No. 61/303,962, filed Feb. 12, 2010 and U.S. Provisional No. 61/224,321, filed Jul. 9, 2009, incorporated herein by reference.

FIELD OF THE INVENTION

The present invention generally relates to methods for recovery of hydrocarbons from hydrocarbon-bearing formations. More particularly, embodiments described herein relate to methods of enhanced hydrocarbon recovery and to compositions useful therein which are specifically designed for use in hydrocarbon-bearing formations wherein the hydrocarbon to be recovered is crude oil which contains a significant amount of specific solubility groups and chemical families.

BACKGROUND OF THE INVENTION

Hydrocarbons may be recovered from hydrocarbon-bearing formations by penetrating the formation with one or more wells through which the hydrocarbons may flow to the surface. Conditions (e.g., permeability, hydrocarbon concentration, porosity, temperature, pressure, water production rates, amongst others) of the formation may affect the economic viability of hydrocarbon production from the hydrocarbon-bearing formation. A hydrocarbon-bearing formation may have natural energy (e.g., gas, water) to aid in mobilizing hydrocarbons to the surface of the hydrocarbon-bearing formation. Natural energy may be in the form of water. Water may exert pressure to mobilize hydrocarbons to one or more production wells. Gas may be present in the hydrocarbon-bearing formation (reservoir) at sufficient pressures to mobilize hydrocarbons to one or more production wells. The natural energy source may become depleted over time.

Supplemental recovery processes may be used to continue recovery of hydrocarbons from the hydrocarbon containing formation. Examples of supplemental processes include waterflooding, polymer flooding, alkali flooding, thermal processes, solution flooding or combinations thereof.

In chemical enhanced oil recovery (EOR) the mobilization of residual oil saturation is achieved through surfactants which generate a sufficiently (ultra) low crude oil/water interfacial tension (IFT) to give a capillary number large enough to overcome capillary forces and allow the oil to flow (I. Chatzis and N. R. Morrows, "Correlation of capillary number relationship for sandstone". SPE Journal, Vol 29, pp 555-562, 1989). However, reservoirs have different characteristics (crude oil type and composition, temperature and the water composition—salinity, cation distribution, hardness) and it is desirable that the structures of added surfactant(s) be matched to these conditions to achieve a low IFT. In addition, a promising surfactant must fulfill other important criteria including low rock retention, compatibility with polymer, thermal and hydrolytic stability and acceptable cost.

Compositions and methods for enhanced hydrocarbon recovery utilizing an alpha olefin sulfate-containing surfactant component are known. U.S. Pat. Nos. 4,488,976 and 4,537,253 describe enhanced oil or recovery compositions containing such chemicals. Compositions and methods for enhanced hydrocarbons recovery utilizing internal olefin sulfonates are also known. Such a surfactant composition is described in U.S. Pat. No. 4,597,879. The compositions described in the foregoing patents have the disadvantages that brine solubility and divalent ion tolerance are insufficient at certain reservoir conditions, which render the products unsuitable for said hydrocarbon-bearing formations.

U.S. Pat. No. 4,979,564 describes the use of internal olefin sulfonates in a method for enhanced oil recovery using low tension viscous waterflood. An example of a commercially available material described as being useful was ENORDET Internal Olefin Sulfonate, IOS 1720, a product of Shell Oil Company identified as a sulfonated $C_{17-20}$ internal olefin sodium salt. This material has a low degree of branching. U.S. Pat. No. 5,068,043 describes a petroleum acid soap-containing surfactant system for waterflooding wherein a cosurfactant comprising a $C_{17-20}$ or a $C_{20-24}$ internal olefin sulfonate was used. In "Field Test of Cosurfactant-enhanced Alkaline Flooding" by Falls et al., *Society of Petroleum Engineers Reservoir Engineering*, 1994, the authors describe the use of a $C_{17-20}$ or a $C_{20-24}$ internal olefin sulfonate in a waterflooding composition with an alcohol alkoxylate surfactant to keep the composition as a single phase at ambient temperature without significantly affecting performance at reservoir temperature. In the above-mentioned reference, the reservoir water had a salinity of about 0.4 wt % sodium chloride. There is also industry experience with the use of certain alcohol alkoxysulfate surfactants. These materials, used individually, also have disadvantages under very severe conditions of salinity, hardness and temperature, in part because certain alcohol alkoxysulfate surfactants are not stable at high temperature, i.e., above about 70° C.

A crude oil (including any generic low API heavy crude oils and/or high API light crude oils) may contain significant amounts of specific solubility groups and chemical families. The overall distribution of both solubility groups and chemical families is a direct result of geochemical processes. The recovery of crude oil containing such components using surfactant flooding presents some unique problems. Such specific solubility groups include saturates, aromatics, asphaltenes and resins. Some of these solubility groups are natural surfactants present in the crude oil. These are polar fractions which under particular conditions may be surface-active and may adversely affect crude oil phase behavior during production operations. Moreover, solubility groups may also contain paraffins, naphthenic acids and basic components. Some of these specific chemical families are known to contribute towards emulsion stabilization under production conditions of oilfield fluids. For naphthenic acids, surface-activity is also a function of pH value. Naphthenic acids and their particular phase behavior may therefore interfere with the desired performance of a surfactant EOR chemical. Crude oils are normally classified using API gravity but this number may mask many of the more detailed characteristics of fluid phase behavior. An understanding of phase behavior, and thus more detailed prediction of chemical EOR may only be achieved by investigating crude oil compositions in more detail (e.g. solubility groups as well as specific chemical families). It appears that conventional surfactants do not provide the desired benefits for certain crude oils. For instance, even internal olefin sulfonates containing up to 20-24 carbons are not sufficiently effective for this commercial use. This may be due to competing solubilization effects of the many components of crude oils in hydrocarbon-bearing formations.

SUMMARY OF THE INVENTION

In an embodiment, hydrocarbons may be produced from a hydrocarbon-bearing formation containing crude oil containing significant amounts of specific solubility groups and chemical families by a method that includes treating at least a portion of the hydrocarbon-bearing formation with a hydrocarbon recovery composition which is comprised of a particular very high molecular weight internal olefin sulfonate. This material is effective over a salinity range of about 1% by weight or lower to about 10% by weight or higher and over a temperature range of from about 40 to 140° C.

The present invention provides a method of treating these crude oil-bearing formations which contain significant amounts of specific solubility groups and chemical families which comprises (a) providing a hydrocarbon recovery composition to at least a portion of a crude oil containing formation, wherein the composition comprises a $C_{24-28}$ internal olefin sulfonate (IOS); and (b) allowing the composition to interact with hydrocarbons and other components in the hydrocarbon containing formation. $C_{15-18}$ internal olefin sulfonates, $C_{19-23}$ internal olefin sulfonates, $C_{20-24}$ internal olefin sulfonates and mixtures thereof may be blended with the $C_{24-28}$ internal olefin sulfonate to enhance its microemulsion behavior. The weight ratio of the $C_{24-28}$ internal olefin sulfonate to the other IOS may be from about 10:90 to about 90:10. Preferably the $C_{24-28}$ internal olefin sulfonate comprises at least about 50% of the IOS blend.

In an embodiment, the hydrocarbon recovery composition may comprise from about 1 to about 75 wt % of the $C_{24-28}$ internal olefin sulfonate or blend containing it, preferably from about 10 to about 40 wt % and more preferably from about 20 to about 30 wt %. In an embodiment, a hydrocarbon composition may be produced from a hydrocarbon-bearing formation. The hydrocarbon composition may include any combination of hydrocarbons, the internal olefin sulfonate described above, a solubilizing agent, associated gas, water, solubility groups (asphaltenes, resins, saturates, aromatics), specific chemical families (naphthenic acids).

In an embodiment, the hydrocarbon recovery composition is provided to the hydrocarbon-bearing formation by admixing it with water and/or brine from the formation. Preferably, the hydrocarbon recovery composition comprises from about 0.01 to about 2.0 wt % of the total water and/or brine/hydrocarbon recovery composition mixture (the injectable fluid). More important is the amount of actual active matter that is present in the injectable fluid (active matter is the surfactant, here the $C_{24-28}$ internal olefin sulfonate or blend containing it). Thus, the amount of the internal olefin sulfonate in the injectable fluid may be from about 0.05 to about 1.0 wt %, preferably from about 0.1 to about 0.8 wt %. The injectable fluid is then injected into the hydrocarbon-bearing formation.

In an embodiment, a hydrocarbon composition may be produced from a hydrocarbon containing formation. The hydrocarbon containing the composition may include any combination of hydrocarbons, internal olefin sulfonate, associated gas, water, solubility groups (asphaltenes, resins, saturates, aromatics), specific chemical families (naphthenic acids, basic nitrogen compounds).

The present invention also provides a method of injecting a hydrocarbon recovery composition comprising a $C_{24-28}$ internal olefin sulfonate into a hydrocarbon containing formation which comprises:

(a) making a solubilized $C_{24-28}$ internal olefin sulfonate (IOS) hydrocarbon recovery composition fluid by mixing a major portion of a $C_{24-28}$ internal olefin sulfonate in fresh water or water having a brine salinity of less than about 2 wt % at a temperature of 50° C. or lower and adding to the mixture a minor portion of a solubilizer which comprises a $C_{15-18}$ internal olefin sulfonate or a $C_{19-23}$ internal olefin sulfonate or mixtures thereof, wherein the weight ratio of the solubilizer to the $C_{24-28}$ internal olefin sulfonate may be from about 10:90 to about 90:10; and (b) injecting the solubilized $C_{24-28}$ internal olefin sulfonate hydrocarbon recovery composition into the hydrocarbon containing formation.

Figure 1:
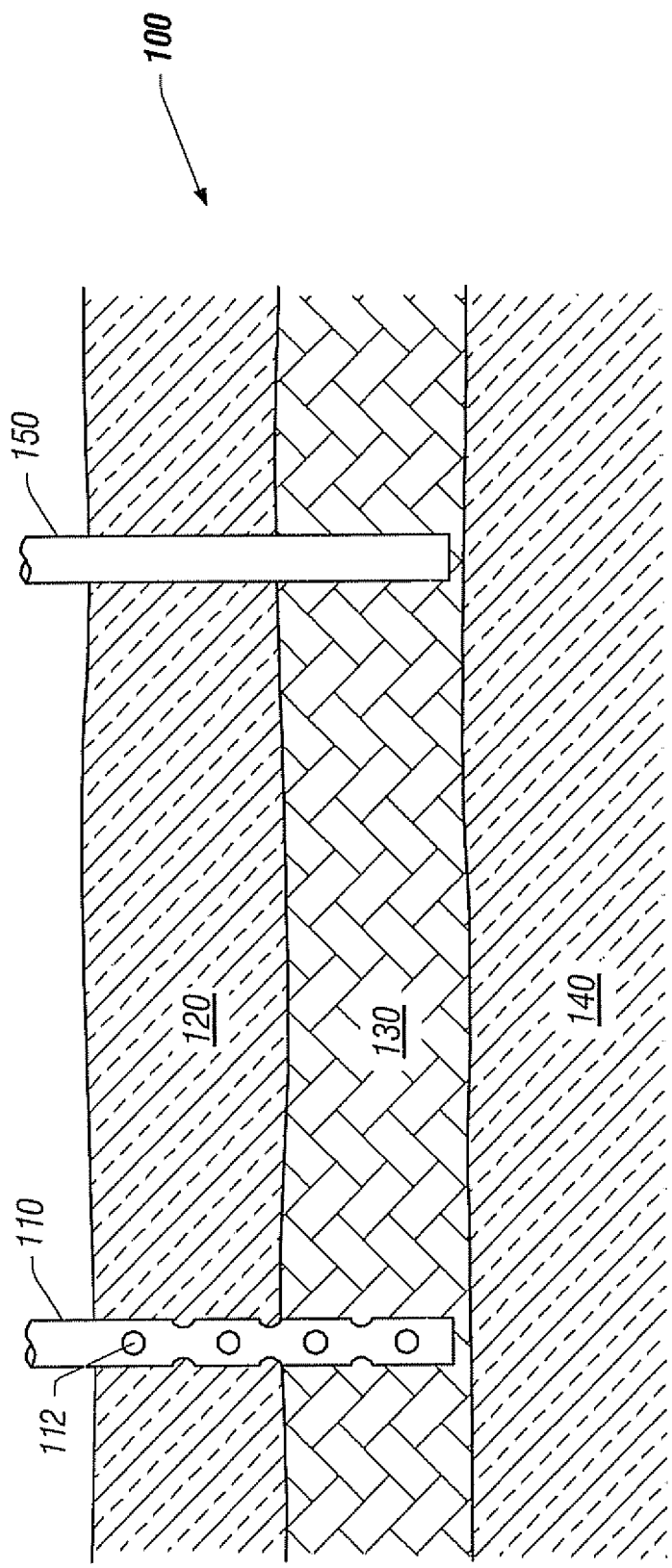
FIG. 1 depicts an embodiment of treating a hydrocarbon-bearing formation.

While the invention is susceptible to various modifications and alternative forms, specific embodiments thereof are shown by way of example in the drawings and will herein be described in detail. It should be understood that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

"Average carbon number" as used herein is determined by multiplying the number of carbon atoms of each internal olefin sulfonate in the mixture of internal olefin sulfonates by the mole percent of that internal olefin sulfonate and then adding the products.

"$C_{15-18}$ internal olefin sulfonate" as used herein means a mixture of internal olefin sulfonates wherein the mixture has an average carbon number of from about 16 to about 17 and at least 50% by weight, preferably at least 75% by weight, most preferably at least 90% by weight, of the internal olefin sulfonates in the mixture contain from 15 to 18 carbon atoms.

"$C_{19-23}$ internal olefin sulfonate" as used herein means a mixture of internal olefin sulfonates wherein the mixture has an average carbon number of from about 21 to about 23 and at least 50% by weight, preferably at least 60% by weight, of the internal olefin sulfonates in the mixture contain from 19 to 23 carbon atoms.

"$C_{20-24}$ internal olefin sulfonate" as used herein means a mixture of internal olefin sulfonates wherein the mixture has an average carbon number of from about 20.5 to about 23 and at least 50% by weight, preferably at least 65% by weight, most preferably at least 75% by weight, of the internal olefin sulfonates in the mixture contain from 20 to 24 carbon atoms.

"$C_{24-28}$ internal olefin sulfonate" as used herein means a blend of internal olefin sulfonates wherein the blend has an average carbon number of from 24.5 to 27 and at least 40% by weight, preferably at least 50% by weight, most preferably at least 60% by weight, of the internal olefin sulfonates in the blend contain from 24 to 28 carbon atoms.

The term "crude oil with specific solubility groups and chemical families" as used herein means crude oil which has an asphaltenes to resin weight ratio of at most about 0.5, a saturates to aromatics weight ratio of at most about 0.7 and a naphthenic acid concentration of at most about 1900 ppm. The crude oil may have an asphaltenes to resin weight ratio of from 0.1 to 0.5. The crude oil may have a saturates to aromatic weight ratio of from 0.1 to 0.7. The crude oil may have a naphthenic acid concentration of from 100 ppmw to 1900 ppmw. The crude oil may have an API ranging from low (<20) to high (>40). Crude oil generally contains measurable quantities of solubility groups such as: asphaltenes, resins, saturates, aromatics. These can be easily measured using conventional oilfield chemistry methods. Crude oil also may contain specific chemical families such as: naphthenic acids and basic nitrogen compounds. These may be measured using conventional and specialized oilfield chemistry methods.

"Asphaltenes" as used herein means the fraction or solubility group of crude oil that is a) insoluble in light alkanes such as n-pentane or n-hexane and b) soluble in aromatic solvents such as toluene and benzene. Asphaltenes are not a specific family of chemicals with common functionality and varying molecular weight. They are a continuum of material—generally at the high end in molecular weight, polarity and aromaticity—some of which may separate as an additional solid phase in response to changes in pressure, composition, and/or temperature. Asphaltenes may comprise polycyclic aromatic clusters substituted with varying alkyl side chains with metal species and the molecular weight may be in the 500-2000 g/mole range.

"Resins" as used herein means the fraction or solubility group of crude oil that is soluble in higher molecular weight normal alkanes such as n-heptane and insoluble in lower molecular weight alkanes such as propane.

"Aromatics" as used herein refers to the fraction or solubility group of benzene and its structural derivatives, the majority of which may contain alkyl chains and cycloalkane rings, along with additional aromatic rings.

"Saturates" as used herein refers to the fraction of solubility group where every carbon atom is attached to two hydrogen atoms, except those at the ends of the chain, which bear three hydrogen atoms, for instance alkanes.

"Naphthenic acids" are used herein means all carboxylic acid containing crude oil components, including for instance fatty acids. These represent a specific chemical family.

Crude oil is often characterized by conventional SARA separation of solubility groups (saturates, aromatic, resins, asphaltenes). First, the asphaltenes are separated by precipitation by alkanes. The remaining soluble components are then separated by high performance liquid chromatography or column chromatography. Specific chemical families such as naphthenic acids and basic nitrogen compounds must be identified using conventional and specialized detailed analytical techniques, such as potentiometric titrations, infrared spectroscopy and mass spectrometry.

Hydrocarbons may be produced from hydrocarbon-bearing formations through wells penetrating a hydrocarbon containing formation. "Hydrocarbons" are generally defined as molecules formed primarily of carbon and hydrogen atoms such as oil and natural gas. Hydrocarbons may also include other elements, such as, but not limited to, halogens, metallic elements, nitrogen, oxygen and/or sulfur. Hydrocarbons derived from a hydrocarbon formation may include, but are not limited to, asphaltenes, resins, saturates, aromatics or combinations thereof. Hydrocarbons may be located within or adjacent to mineral matrices within the earth. Matrices may include, but are not limited to, sedimentary rock, sands, silicilytes, carbonates, diatomites and other porous media.

A "formation" includes one or more hydrocarbon containing layers, one or more non-hydrocarbon layers, an overburden and/or an underburden. An "overburden" and/or an "underburden" includes one or more different types of impermeable materials. For example, overburden/underburden may include rock, shale, mudstone, or wet/tight carbonate (i.e., an impermeable carbonate without hydrocarbons). For example, an underburden may contain shale or mudstone. In some cases, the overburden/underburden may be somewhat permeable. For example, an underburden may be composed of a permeable mineral such as sandstone or limestone. In some embodiments, at least a portion of a hydrocarbon-bearing formation may exist at less than or more than 1000 feet below the earth's surface.

Properties of a hydrocarbon-bearing formation may affect how hydrocarbons flow through an underburden/overburden to one or more production wells. Properties include, but are not limited to, mineralogy, porosity, permeability, pore size distribution, surface area, salinity and temperature of the formation. Overburden/underburden properties in combination with hydrocarbon properties, such as, capillary pressure (static) characteristics and relative permeability (flow) characteristics may affect mobilization of hydrocarbons through the hydrocarbon containing formation.

Permeability of a hydrocarbon-bearing formation may vary depending on the formation composition. A relatively permeable formation may include heavy hydrocarbons entrained in, for example, sand or carbonate. "Relatively permeable," as used herein, refers to formations or portions thereof, that have an average permeability of 10 millidarcy or more. "Relatively low permeability" as used herein, refers to formations or portions thereof that have an average permeability of less than about 10 millidarcy. One darcy is equal to about 0.99 square micrometers. An impermeable portion of a formation generally has a permeability of less than about 0.1 millidarcy. In some cases, a portion or all of a hydrocarbon of a relatively permeable formation may include predominantly heavy hydrocarbons and/or tar with no supporting mineral grain framework and only floating (or no) mineral matter (e.g., asphalt lakes).

Fluids (e.g., gas, water, hydrocarbons or combinations thereof) of different densities may exist in a hydrocarbon-bearing formation. A mixture of fluids in the hydrocarbon-bearing formation may form layers between an underburden and an overburden according to fluid density. Gas may form a top layer, hydrocarbons may form a middle layer and water may form a bottom layer in the hydrocarbon-bearing formation. The fluids may be present in the hydrocarbon-bearing formation in various amounts. Interactions between the fluids in the formation may create interfaces or boundaries between the fluids. Interfaces or boundaries between the fluids and the formation may be created through interactions between the fluids and the formation. Typically, gases do not form boundaries with other fluids in a hydrocarbon containing formation. In an embodiment, a first boundary may form between a water layer and underburden. A second boundary may form between a water layer and a hydrocarbon layer. A third boundary may form between hydrocarbons of different densities in a hydrocarbon-bearing formation. Multiple fluids with multiple boundaries may be present in a hydrocarbon-bearing formation, in some embodiments. It should be understood that many combinations of boundaries between fluids and between fluids and the overburden/underburden may be present in a hydrocarbon-bearing formation.

Production of fluids may perturb the interaction between fluids and between fluids and the overburden/underburden. As fluids are removed from the hydrocarbon containing formation, the different fluid layers may mix and form mixed fluid layers. The mixed fluids may have different interactions at the fluid boundaries. Depending on the interactions at the boundaries of the mixed fluids, production of hydrocarbons may become difficult. Quantification of the interactions (e.g., energy level) at the interface of the fluids and/or fluids and overburden/underburden may be useful to predict mobilization of hydrocarbons through the hydrocarbon-bearing formation.

Quantification of energy required for interactions (e.g., mixing) between fluids within a formation at an interface may be difficult to measure. Quantification of energy levels at an interface between fluids may be determined by generally known techniques (e.g., spinning drop tensionmeter, Langmuir trough). Interaction energy requirements at an interface may be referred to as interfacial tension. "Interfacial tension" as used herein, refers to a surface free energy that exists between two or more fluids that exhibit a boundary. A high interfacial tension value (e.g., greater than about 10 dynes/cm) may indicate the inability of one fluid to mix with a second fluid to form a fluid emulsion. As used herein, an "emulsion" refers to a dispersion of one immiscible fluid into a second fluid by addition of a composition that reduces the interfacial tension between the fluids to achieve some degree of stability. The inability of the fluids to mix may be due to high surface interaction energy between the two fluids or due to the presence of solubility groups or specific chemical families Low interfacial tension values (e.g., less than about 1 dyne/cm) may indicate less surface interaction between the two immiscible fluids. Less surface interaction energy between two immiscible fluids may result in the mixing of the two fluids to form an emulsion. Fluids with low interfacial tension values may be mobilized to a well bore due to reduced capillary forces and subsequently produced from a hydrocarbon-bearing formation. Interfacial tension is also a function of aqueous properties such as pH and cation content.

Fluids in a hydrocarbon-bearing formation may wet (e.g., adhere to an overburden/underburden or spread onto an overburden/underburden in a hydrocarbon containing formation). As used herein, "wettability" refers to the preference of a fluid to spread on or adhere to a solid surface in a formation in the presence of other fluids. Methods to determine wettability of a hydrocarbon formation are described by Craig, Jr. in "The Reservoir Engineering Aspects of Waterflooding", 1971 Monograph Volume 3, Society of Petroleum Engineers, which is herein incorporated by reference. In an embodiment, hydrocarbons may adhere to sandstone in the presence of gas or water. An overburden/underburden that is substantially coated by hydrocarbons may be referred to as "oil wet." An overburden/underburden may be oil wet due to the presence of polar and/or or surface-active components (e.g., asphaltenes) in the hydrocarbon-bearing formation. Formation composition (e.g., silica, carbonate or clay) may determine the amount of adsorption of hydrocarbons on the surface of an overburden/underburden. In some embodiments, a porous and/or permeable formation may allow hydrocarbons to more easily wet the overburden/underburden. A substantially oil wet overburden/underburden may inhibit hydrocarbon production from the hydrocarbon-bearing formation. In certain embodiments, an oil wet portion of a hydrocarbon-bearing formation may be located at less than or more than 1000 feet below the earth's surface.

A hydrocarbon formation may include water. Water may interact with the surface of the underburden. As used herein, "water wet" refers to the formation of a coat of water on the surface of the overburden/underburden. A water wet overburden/underburden may enhance hydrocarbon production from the formation by preventing hydrocarbons from wetting the overburden/underburden. In certain embodiments, a water wet portion of a hydrocarbon-bearing formation may include minor amounts of polar and/or or surface-active components.

Water in a hydrocarbon-bearing formation may contain minerals (e g, minerals containing barium, calcium, or magnesium) and mineral salts (e.g., sodium chloride, potassium chloride, magnesium chloride). Water salinity, cation content, pH and/or water hardness in a formation may affect recovery of hydrocarbons in a hydrocarbon-bearing formation. As used herein "salinity" refers to an amount of dissolved solids in water. "Water hardness," as used herein, refers to a concentration of divalent ions (e.g., calcium, magnesium) in the water. Water salinity and hardness may be determined by generally known methods (e.g., conductivity, titration). As water salinity increases in a hydrocarbon-bearing formation, interfacial tensions between hydrocarbons and water may be increased and the fluids may become more difficult to produce. The interfacial tension is also a strong function of the dominant cation present in the water phase, pH and temperature.

A hydrocarbon-bearing formation may be selected for treatment based on factors such as, but not limited to, thickness of hydrocarbon containing layers within the formation, assessed liquid production content, location of the formation, salinity content of the formation, temperature of the formation, mineralogy and depth of hydrocarbon-bearing layers. Initially, natural formation pressure and temperature may be sufficient to cause hydrocarbons to flow into well bores and out to the surface. Temperatures in a hydrocarbon containing formation may range from about 0° C. to about 300° C. The composition of the present invention is particularly advantageous when used at high temperature because the internal olefin sulfonate is stable at such temperatures. As hydrocarbons are produced from a hydrocarbon-bearing formation, pressures and/or temperatures within the formation may decline. Various forms of artificial lift (e.g., pumps, gas injection) and/or heating may be employed to continue to produce hydrocarbons from the hydrocarbon-bearing formation. Production of desired hydrocarbons from the hydrocarbon-bearing formation may become uneconomical as hydrocarbons are depleted from the formation.

Mobilization of residual hydrocarbons retained in a hydrocarbon-bearing formation may be difficult due to viscosity of the hydrocarbons and capillary effects of fluids in pores of the hydrocarbon-bearing formation. As used herein "capillary forces" refers to attractive forces between fluids and at least a portion of the hydrocarbon-bearing containing formation. In an embodiment, capillary forces may be overcome by increasing the pressures within a hydrocarbon-bearing formation. In other embodiments, capillary forces may be overcome by reducing the interfacial tension between fluids in a hydrocarbon-bearing formation. The ability to reduce the capillary forces in a hydrocarbon-bearing formation may depend on a number of factors, including, but not limited to, the temperature of the hydrocarbon-bearing formation, the salinity and cationic composition of water in the hydrocarbon-bearing containing formation, and the precise composition of the hydrocarbon-bearing formation.

As production rates decrease, additional methods may be employed to make a hydrocarbon-bearing formation more economically viable. Methods may include adding sources of water (e.g., brine, steam), gases (e.g., carbon dioxide, nitrogen), alkaline fluids, polymers, monomers or any combinations thereof to the hydrocarbon formation to increase mobilization of hydrocarbons.

In an embodiment, a hydrocarbon-bearing formation may be treated with a flood of water. A waterflood may include injecting water into a portion of a hydrocarbon-bearing formation through injections wells. Flooding of at least a portion of the formation may water wet a portion of the hydrocarbon-bearing formation. The water wet portion of the hydrocarbon-bearing formation may be pressurized by known methods and a water/hydrocarbon mixture may be collected using one or more production wells. The water layer, however, may not mix with the hydrocarbon layer efficiently. Poor mixing efficiency may be due to a high interfacial tension between the water and hydrocarbons.

Production from a hydrocarbon-bearing formation may be enhanced by treating the hydrocarbon-bearing formation with a polymer and/or monomer that may mobilize hydrocarbons to one or more production wells. The polymer and/or monomer may reduce the mobility of the water phase in pores of the hydrocarbon-bearing formation. The reduction of water mobility may allow the hydrocarbons to be more easily mobilized through the hydrocarbon-bearing formation. Polymers include, but are not limited to, polyacrylamides, partially hydrolyzed polyacrylamide, polyacrylates, ethylenic copolymers, biopolymers, carboxymethylcellulose, polyvinyl alcohol, polystyrene sulfonates, polyvinylpyrrolidone, AMPS (2-acrylamide-2-methyl propane sulfonate) or combinations and or modifications thereof. Examples of ethylenic copolymers include copolymers of acrylic acid and acrylamide, acrylic acid and lauryl acrylate, lauryl acrylate and acrylamide. Examples of biopolymers include xanthan gum and guar gum. In some embodiments, polymers may be cross linked in situ in a hydrocarbon-bearing formation. In other embodiments, polymers may be generated in situ in a hydrocarbon-bearing formation. Polymers and polymer preparations for use in oil recovery are described in U.S. Pat. No. 6,427,268 to Zhang et al., entitled "Method For Making Hydrophobically Associative Polymers, Methods of Use and Compositions;" U.S. Pat. No. 6,439,308 to Wang, entitled "Foam Drive Method;" U.S. Pat. No. 5,654,261 to Smith, entitled, "Permeability Modifying Composition For Use In Oil Recovery;" U.S. Pat. No. 5,284,206 to Surles et al., entitled "Formation Treating;" U.S. Pat. No. 5,199,490 to Surles et al., entitled "Formation Treating" and U.S. Pat. No. 5,103,909 to Morgenthaler et al., entitled "Profile Control In Enhanced Oil Recovery," all of which are incorporated by reference herein.

The Hydrocarbon Recovery Composition

In an embodiment, a hydrocarbon recovery composition may be provided to the hydrocarbon-bearing formation. In this invention the composition comprises a particular internal olefin sulfonate or blend of internal olefin sulfonates. Internal olefin sulfonates are chemically suitable for EOR because they have a low tendency to form ordered structures/liquid crystals (which can be a major issue because ordered structures tend to lead to plugging of the rock structure in hydrocarbon formations, and possible emulsion formation) because they are a complex mixture of surfactants of with different chain lengths. Internal olefin sulfonates show a low tendency to adsorb on reservoir rock surfaces arising from negative-negative charge repulsion between the surface and the surfactant. The use of alkali further reduces the tendency for surfactants to adsorb and reduced losses means a lower concentration of the surfactant can be used making the process more economic. However this may also lead to emulsion stabilization due to the presence of natural surfactants present in the crude oil (e.g., naphthenic acids). Therefore, selection of crude oils for this chemical EOR method must be done with caution. Moreover, injection of alkali may lead to formation damage in particular mineralogy.

As discussed above in detail, this invention is particularly useful in hydrocarbon-bearing formations which contain crude oil with particular composition (e.g. solubility groups and specific chemical families). The hydrocarbon recovery composition of this invention is designed to produce the best internal olefin sulfonate recovery composition for these hydrocarbon-bearing formations and for the brine found in these formations. The preferred composition comprises a $C_{24-28}$ internal olefin sulfonate.

An internal olefin is an olefin whose double bond is located anywhere along the carbon chain except at a terminal carbon atom. A linear internal olefin does not have any alkyl, aryl, or alicyclic branching on any of the double bond carbon atoms or on any carbon atoms adjacent to the double bond carbon atoms. Typical commercial products produced by isomerization of alpha olefins are predominantly linear and contain a low average number of branches per molecule.

In an embodiment, the hydrocarbon recovery composition may comprise from about 1 to about 75 wt % of the $C_{24-28}$ internal olefin sulfonate or blend containing it, preferably from about 10 to about 40 wt % and more preferably from about 20 to about 30 wt %. In an embodiment, a hydrocarbon containing composition may be produced from a hydrocarbon-bearing formation. The hydrocarbon-bearing composition may include any combination of hydrocarbons, the internal olefin sulfonate described above, a solubilizing agent, gas, water, crude oil solubility groups (e.g., asphaltenes, resins), specific chemical families (e.g., naphthenic acids, basic nitrogen compounds).

The remainder of the composition may include, but is not limited to, water, low molecular weight alcohols, organic solvents, alkyl sulfonates, aryl sulfonates, brine or combinations thereof. Low molecular weight alcohols include, but are not limited to, methanol, ethanol, propanol, isopropyl alcohol, tert-butyl alcohol, sec-butyl alcohol, butyl alcohol, tert-amyl alcohol or combinations thereof. Organic solvents include, but are not limited to, methyl ethyl ketone, acetone, lower alkyl cellosolves, lower alkyl carbitols or combinations thereof.

Manufacture of the Hydrocarbon Recovery Composition

The internal olefins that are used to make the internal olefin sulfonates of the present invention may be made by skeletal isomerization. Suitable processes for making the internal olefins include those described in U.S. Pat. Nos. 5,510,306, 5,633,422, 5,648,584, 5,648,585, 5,849,960, and European Patent EP 0,830,315 B1, all of which are herein incorporated by reference in their entirety. A hydrocarbon stream comprising at least one linear olefin is contacted with a suitable catalyst, such as the catalytic zeolites described in the aforementioned patents, in a vapor phase at a suitable reaction temperature, pressure, and space velocity. Generally, suitable reaction conditions include a temperature of about 200 to about 650° C., an olefin partial pressure of above about 0.5 atmosphere, and a total pressure of about 0.5 to about 10.0 atmospheres or higher. Preferably, the internal olefins of the present invention are made at a temperature in the range of from about 200 to about 500° C. at an olefin partial pressure of from about 0.5 to 2 atmospheres.

It is generally known that internal olefins are more difficult to sulfonate than alpha olefins (see "Tenside Detergents" 22 (1985) 4, pp. 193-195). In the article entitled "Why Internal Olefins are Difficult to Sulfonate," the authors state that by the sulfonation of various commercial and laboratory produced internal olefins using falling film reactors, internal olefins gave conversions of below 90 percent and further they state that it was found necessary to raise the $SO_3$:internal olefin mole ratio to over 1.6:1 in order to achieve conversions above 95 percent. Furthermore, there resulting products were very dark in color and had high levels of di- and poly-sulfonated products.

U.S. Pat. Nos. 4,183,867 and 4,248,793, which are herein incorporated by reference, disclose processes which can be used to make the branched internal olefin sulfonates of the invention. They are carried out in a falling film reactor for the preparation of light color internal olefin sulfonates. The amounts of unreacted internal olefins are between 10 and 20 percent and at least 20 percent, respectively, in the processes and special measures must be taken to remove the unreacted internal olefins. The internal olefin sulfonates containing between 10 and 20 percent and at least 20 percent, respectively, of unreacted internal olefins must be purified before being used. Consequently, the preparation of internal olefin sulfonates having the desired light color and with the desired low free oil content offer substantial difficulty.

Such difficulties can be avoided by following the process disclosed in European Patent EP 0,351,928 B1, which is herein incorporated by reference.

A process which can be used to make internal olefin sulfonates for use in the present invention comprises reacting in a film reactor an internal olefin as described above with a sulfonating agent in a mole ratio of sulfonating agent to internal olefin of 1:1 to 1.25:1 while cooling the reactor with a cooling means having a temperature not exceeding 35° C., directly neutralizing the obtained reaction product of the sulfonating step and, without extracting the unreacted internal olefin, hydrolyzing the neutralized reaction product.

In the preparation of the sulfonates derived from internal olefins, the internal olefins are reacted with a sulfonating agent, which may be sulfur trioxide, sulfuric acid, or oleum, with the formation of beta-sultone and some alkane sulfonic acids. The film reactor is preferably a falling film reactor.

The reaction products are neutralized and hydrolyzed. Under certain circumstances, for instance, aging, the beta-sultones are converted into gamma-sultones which may be converted into delta-sultones. After neutralization and hydrolysis, gamma-hydroxy sulfonates and delta-hydroxy sulfonates are obtained. A disadvantage of these two sultones is that they are more difficult to hydrolyze than beta-sultones. Thus, in most embodiments it is preferable to proceed without aging. The beta sultones, after hydrolysis, give beta-hydroxy sulfonates. These materials do not have to be removed because they form useful surfactant structures. The cooling means, which is preferably water, has a temperature not exceeding 35° C., especially a temperature in the range of from 0 to 25° C. Depending upon the circumstances, lower temperatures may be used as well.

The reaction mixture is then fed to a neutralization hydrolysis unit. The neutralization/hydrolysis is carried out with a water soluble base, such as sodium hydroxide or sodium carbonate. The corresponding bases derived from potassium or ammonium are also suitable. The neutralization of the reaction product from the falling film reactor is generally carried out with excessive base, calculated on the acid component. Generally, neutralization is carried out at a temperature in the range of from 0 to 80° C. Hydrolysis may be carried out at a temperature in the range of from 100 to 250° C., preferably 130 to 200° C. The hydrolysis time generally may be from 5 minutes to 4 hours. Alkaline hydrolysis may be carried out with hydroxides, carbonates, bicarbonates of (earth) alkali metals, and amine compounds.

This process may be carried out batchwise, semi-continuously, or continuously. The reaction is generally performed in a falling film reactor which is cooled by flowing a cooling means at the outside walls of the reactor. At the inner walls of the reactor, the internal olefin flows in a downward direction. Sulfur trioxide is diluted with a stream of nitrogen, air, or any other inert gas into the reactor. The concentration of sulfur trioxide generally is between 2 and 5 percent by volume based on the volume of the carrier gas. In the preparation of internal olefin sulfonates derived from the olefins of the present invention, it is required that in the neutralization hydrolysis step very intimate mixing of the reactor product and the aqueous base is achieved. This can be done, for example, by efficient stirring or the addition of a polar cosolvent (such as a lower alcohol) or by the addition of a phase transfer agent.

Injection of the Hydrocarbon Recovery Composition

The hydrocarbon recovery composition may interact with hydrocarbons in at least a portion of the hydrocarbon containing formation. Interaction with the hydrocarbons may reduce an interfacial tension of the hydrocarbons with one or more fluids in the hydrocarbon-bearing formation. In other embodiments, a hydrocarbon recovery composition may reduce the interfacial tension between the hydrocarbons and an overburden/underburden of a hydrocarbon-bearing formation. Reduction of the interfacial tension may allow at least a portion of the hydrocarbons to mobilize through the hydrocarbon-bearing formation.

The ability of a hydrocarbon recovery composition to reduce the interfacial tension of a mixture of hydrocarbons and fluids may be evaluated using known techniques. In an embodiment, an interfacial tension value for a mixture of hydrocarbons and water may be determined using a spinning drop tensionmeter. This is carried out under controlled laboratory conditions, so it is only an approximation of reservoir conditions. An amount of the hydrocarbon recovery composition may be added to the hydrocarbon/water mixture and an interfacial tension value for the resulting fluid may be determined. A low interfacial tension value (e.g., less than about 1 dyne/cm) may indicate that the composition reduced at least a portion of the surface energy between the hydrocarbons and water. Reduction of surface energy may indicate that at least a portion of the hydrocarbon/water mixture may mobilize through at least a portion of a hydrocarbon-bearing formation.

In an embodiment, a hydrocarbon recovery composition may be added to a hydrocarbon/water mixture and the interfacial tension value may be determined. Preferably, the interfacial tension is less than about 0.1 dyne/cm. An ultralow interfacial tension value (e.g., less than about 0.01 dyne/cm) may indicate that the hydrocarbon recovery composition lowered at least a portion of the surface tension between the hydrocarbons and water such that at least a portion of the hydrocarbons may mobilize through at least a portion of the hydrocarbon-bearing formation. At least a portion of the hydrocarbons may mobilize more easily through at least a portion of the hydrocarbon-bearing formation at an ultra low interfacial tension than hydrocarbons that have been treated with a composition that results in an interfacial tension value greater than 0.01 dynes/cm for the fluids in the formation. Addition of a hydrocarbon recovery composition to fluids in a hydrocarbon-bearing formation that results in an ultra-low interfacial tension value may increase the efficiency at which hydrocarbons may be produced. A hydrocarbon recovery composition concentration in the hydrocarbon containing formation may be minimized to minimize cost of use during production.

In an embodiment of a method to treat a hydrocarbon-bearing formation, a hydrocarbon recovery composition including an internal olefin sulfonate may be provided (e.g., injected) into hydrocarbon-bearing formation 100 through injection well 110 as depicted in FIG. 1. Hydrocarbon formation 100 may include overburden 120, hydrocarbon layer 130, and underburden 140. Injection well 110 may include openings 112 that allow fluids to flow through hydrocarbon containing formation 100 at various depth levels. In certain embodiments, hydrocarbon layer 130 may be less than 1000 feet below earth's surface. In some embodiments, underburden 140 of hydrocarbon containing formation 100 may be oil wet. Low salinity water may be present in hydrocarbon containing formation 100, in other embodiments.

A hydrocarbon recovery composition may be provided to the formation in an amount based on hydrocarbons present in a hydrocarbon-bearing formation. The amount of hydrocarbon recovery composition, however, may be too small to be accurately delivered to the hydrocarbon-bearing formation using known delivery techniques (e.g., pumps). To facilitate delivery of small amounts of the hydrocarbon recovery composition to the hydrocarbon-bearing formation, the hydrocarbon recovery composition may be combined with water and/or brine to produce an injectable fluid.

In an embodiment, the hydrocarbon recovery composition is provided to the formation containing crude oil with heavy components by admixing it with brine from the formation from which hydrocarbons are to be extracted or with fresh water. The mixture is then injected into the hydrocarbon-bearing formation.

In an embodiment, the hydrocarbon recovery composition is provided to a hydrocarbon-bearing formation 100 by admixing it with brine from the formation. Preferably, the hydrocarbon recovery composition comprises from about 0.01 to about 2.00 wt % of the total water and/or brine/hydrocarbon recovery composition mixture (the injectable fluid). More important is the amount of actual active matter that is present in the injectable fluid (active matter is the surfactant, here the $C_{24-28}$ internal olefin sulfonate or the blend containing it). Thus, the amount of the internal olefin sulfonate in the injectable fluid may be from about 0.05 to about 1.0 wt %, preferably from about 0.1 to about 0.8 wt %. More than 1.0 wt % could be used but this would likely increase the cost without enhancing the performance. The injectable fluid is then injected into the hydrocarbon-bearing formation.

$C_{15-18}$ internal olefin sulfonates, $C_{19-23}$ internal olefin sulfonates, $C_{20-24}$ internal olefin sulfonates and mixtures thereof may be blended with the $C_{24-28}$ internal olefin sulfonate to enhance its microemulsion behavior. The weight ratio of the $C_{24-28}$ internal olefin sulfonate to the other IOS may be from about 10:90 to about 90:10. Preferably the $C_{24-28}$ internal olefin sulfonate comprises at least about 50% by weight of the IOS blend.

The C24-28 internal olefin sulfonate may be used without a co-surfactant and/or a solvent. The $C_{24-28}$ internal olefin sulfonate may not perform optimally by itself for certain crude oils. This is a result of the overall crude oil composition. Co-surfactants and/or co-solvents may be added to the hydrocarbon recovery composition to enhance the activity. In one embodiment, the hydrocarbon recovery composition comprised $C_{24-28}$ internal olefin sulfonate, $C_{15-18}$ internal olefin sulfonate and 2-butanol.

The hydrocarbon recovery composition may interact with at least a portion of the hydrocarbons in hydrocarbon layer 130. The interaction of the hydrocarbon recovery composition with hydrocarbon layer 130 may reduce at least a portion of the interfacial tension between different hydrocarbons. The hydrocarbon recovery composition may also reduce at least a portion of the interfacial tension between one or more fluids (e.g., water, hydrocarbons) in the formation and the underburden 140, one or more fluids in the formation and the overburden 120 or combinations thereof.

In an embodiment, a hydrocarbon recovery composition may interact with at least a portion of hydrocarbons and at least a portion of one or more other fluids in the formation to reduce at least a portion of the interfacial tension between the hydrocarbons and one or more fluids. Reduction of the interfacial tension may allow at least a portion of the hydrocarbons to form an emulsion with at least a portion of one or more fluids in the formation. An interfacial tension value between the hydrocarbons and one or more fluids may be altered by the hydrocarbon recovery composition to a value of less than about 0.1 dyne/cm. In some embodiments, an interfacial tension value between the hydrocarbons and other fluids in a formation may be reduced by the hydrocarbon recovery composition to be less than about 0.05 dyne/cm. An interfacial tension value between hydrocarbons and other fluids in a formation may be lowered by the hydrocarbon recovery composition to less than 0.001 dyne/cm, in other embodiments.

At least a portion of the hydrocarbon recovery composition/hydrocarbon/fluids mixture may be mobilized to production well 150. Products obtained from the production well 150 may include, but are not limited to, components of the hydrocarbon recovery composition (e.g., a long chain aliphatic alcohol and/or a long chain aliphatic acid salt), gas, water, hydrocarbons, solubility groups (e.g., asphaltenes, resins) and/or chemical families (naphthenic acids, basic nitrogen), or combinations thereof. Hydrocarbon production from hydrocarbon-bearing formation 100 may be increased by greater than about 50% after the hydrocarbon recovery composition has been added to a hydrocarbon-bearing formation.

In certain embodiments, hydrocarbon-bearing formation 100 may be pretreated with a hydrocarbon removal fluid. A hydrocarbon removal fluid may be composed of water, steam, brine, gas, liquid polymers, foam polymers, monomers or mixtures thereof. A hydrocarbon removal fluid may be used to treat a formation before a hydrocarbon recovery composition is provided to the formation. Hydrocarbon-bearing formation 100 may be less than 1000 feet below the earth's surface, in some embodiments. A hydrocarbon removal fluid may be heated before injection into a hydrocarbon-bearing formation 100, in certain embodiments. A hydrocarbon removal fluid may reduce a viscosity of at least a portion of the hydrocarbons within the formation. Reduction of the viscosity of at least a portion of the hydrocarbons in the formation may enhance mobilization of at least a portion of the hydrocarbons to production well 150. After at least a portion of the hydrocarbons in hydrocarbon-bearing formation 100 have been mobilized, repeated injection of the same or different hydrocarbon removal fluids may become less effective in mobilizing hydrocarbons through the hydrocarbon-bearing formation. Low efficiency of mobilization may be due to hydrocarbon removal fluids creating more permeable zones in hydrocarbon-bearing formation 100. Hydrocarbon removal fluids may pass through the permeable zones in the hydrocarbon-bearing formation 100 and not interact with and mobilize the remaining hydrocarbons. Consequently, displacement of heavier hydrocarbons adsorbed to underburden 140 may be reduced over time. Eventually, the formation may be considered low producing or economically undesirable to produce hydrocarbons.

In certain embodiments, injection of a hydrocarbon recovery composition after treating the hydrocarbon containing formation with a hydrocarbon removal fluid may enhance mobilization of heavier hydrocarbons absorbed to underburden 140. The hydrocarbon recovery composition may interact with the hydrocarbons to reduce an interfacial tension between the hydrocarbons and underburden 140. Reduction of the interfacial tension may be such that hydrocarbons are mobilized to and produced from production well 150. Produced hydrocarbons from production well 150 may include, in some embodiments, at least a portion of the components of the hydrocarbon recovery composition, the hydrocarbon removal fluid injected into the well for pretreatment, methane, carbon dioxide, ammonia, or combinations thereof. Adding the hydrocarbon recovery composition to at least a portion of a low producing hydrocarbon-bearing formation may extend the production life of the hydrocarbon-bearing formation. Hydrocarbon production from hydrocarbon-bearing formation 100 may be increased by greater than about 50% after the hydrocarbon recovery composition has been added to hydrocarbon-bearing formation. Increased hydrocarbon production may increase the economic viability of the hydrocarbon-bearing formation.

Interaction of the hydrocarbon recovery composition with at least a portion of hydrocarbons in the formation may reduce at least a portion of an interfacial tension between the hydrocarbons and underburden 140. Reduction of at least a portion of the interfacial tension may mobilize at least a portion of hydrocarbons through hydrocarbon-bearing formation 100. Mobilization of at least a portion of hydrocarbons, however, may not be at an economically viable rate. In one embodiment, polymers and/or monomers may be injected into hydrocarbon formation 100 through injection well 110, after treatment of the formation with a hydrocarbon recovery composition, to increase mobilization of at least a portion of the hydrocarbons through the formation. Suitable polymers include, but are not limited to, CIBA® ALCOFLOOD®, manufactured by Ciba Specialty Additives (Tarrytown, N.Y.), Tramfloc® manufactured by Tramfloc Inc. (Temple, Ariz.), and HE® polymers manufactured by Chevron Phillips Chemical Co. (The Woodlands, Tex.). Interaction between the hydrocarbons, the hydrocarbon recovery composition and the polymer may increase mobilization of at least a portion of the hydrocarbons remaining in the formation to production well 150.

The internal olefin sulfonate of the composition is thermally stable and may be used over a wide range of temperatures. The hydrocarbon recovery composition may be added to a portion of a hydrocarbon-bearing formation 100 that has an average temperature of above about 70° C. because of the high thermal stability of the internal olefin sulfonate.

Figure 2:
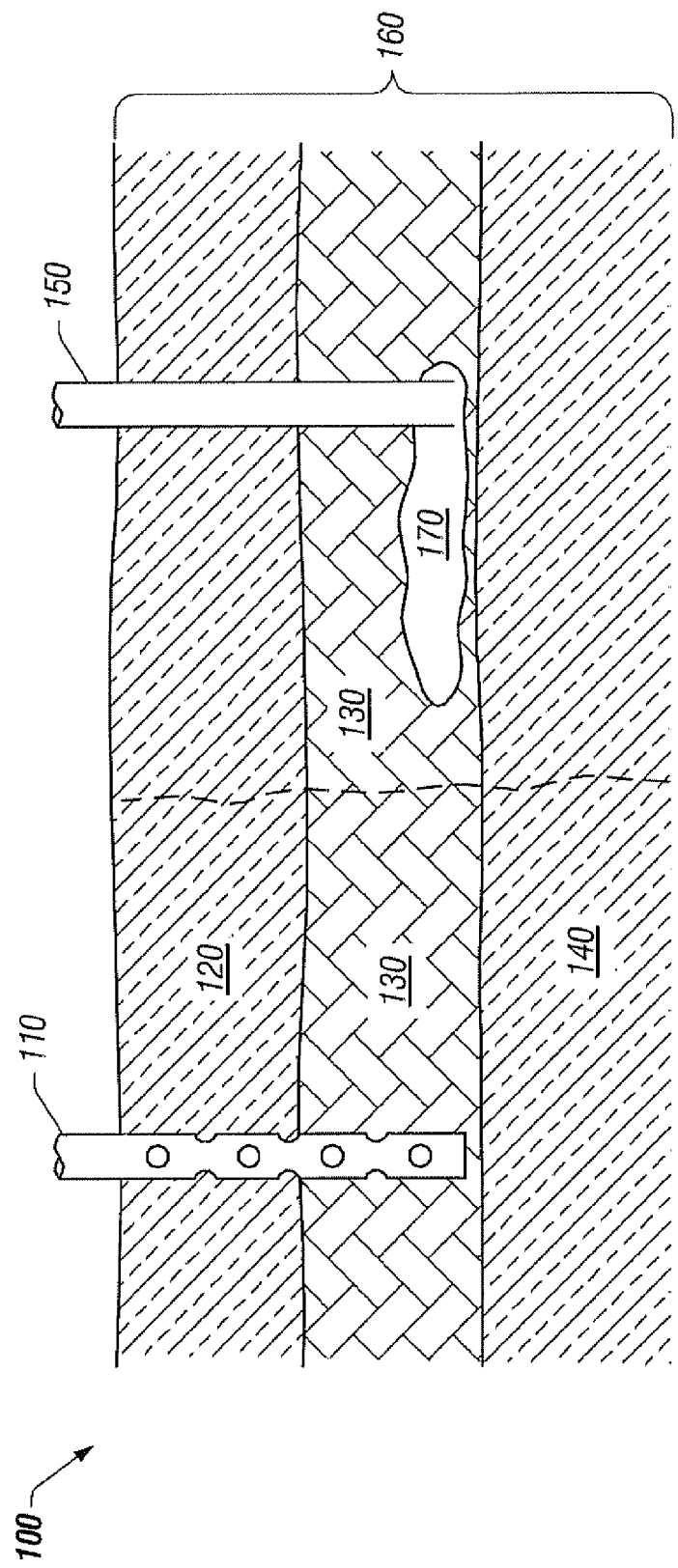
FIG. 2 depicts an embodiment of treating a hydrocarbon-bearing formation.

In some embodiments, a hydrocarbon recovery composition may be combined with at least a portion of a hydrocarbon removal fluid (e.g. water, polymer solutions) to produce an injectable fluid. The hydrocarbon recovery composition may be injected into hydrocarbon-bearing formation 100 through injection well 110 as depicted in FIG. 2. Interaction of the hydrocarbon recovery composition with hydrocarbons in the formation may reduce at least a portion of an interfacial tension between the hydrocarbons and underburden 140. Reduction of at least a portion of the interfacial tension may mobilize at least a portion of hydrocarbons to a selected section 160 in hydrocarbon-bearing formation 100 to form hydrocarbon pool 170. At least a portion of the hydrocarbons may be produced from hydrocarbon pool 170 in the selected section of hydrocarbon-bearing formation 100.

In other embodiments, mobilization of at least a portion of hydrocarbons to selected section 160 may not be at an economically viable rate. Polymers may be injected into hydrocarbon formation 100 to increase mobilization of at least a portion of the hydrocarbons through the formation. Interaction between at least a portion of the hydrocarbons, the hydrocarbon recovery composition and the polymers may increase mobilization of at least a portion of the hydrocarbons to production well 150.

In some embodiments, a hydrocarbon recovery composition may include an inorganic salt (e.g. sodium carbonate ($Na_2CO_3$), sodium hydroxide, sodium chloride (NaCl), or calcium chloride ($CaCl_2$)). The addition of the inorganic salt may help the hydrocarbon recovery composition disperse throughout a hydrocarbon/water mixture. The enhanced dispersion of the hydrocarbon recovery composition may decrease the interactions between the hydrocarbon and water interface. Addition of different salts will affect the final IFT of the system. The use of an alkali (e.g., sodium carbonate, sodium hydroxide) may prevent adsorption of the IOS onto the rock surface and may create natural surfactants with components in the crude oil. The decreased interaction may lower the interfacial tension of the mixture and provide a fluid that is more mobile. The alkali may be added in an amount of from about 0.1 to 2.0 wt %.

Under the temperature and pressure conditions in the reservoir, the $C_{24-28}$ internal olefin sulfonate is soluble and is effective in lowering the IFT. However, conditions above ground where the injectable fluid composition is prepared are different, i.e., lower temperature and pressure. Under such conditions and in a low salinity brine or freshwater (no salinity), the $C_{24-28}$ internal olefin sulfonate may not be completely soluble. Before the injectable fluid can be injected, at least a significant portion of the $C_{24-28}$ internal olefin sulfonate falls out of the mixture. Any portion of the surfactant that is not in solution, i.e. that remains insoluble and forms a waxy precipitate, will eventually plug the porous formation around the wellbore. The result will be that the injection well will plug, with the consequent loss of the ability to inject the fluid. Remedial treatments will have to be done to the well to put it back in function with the consequent loss of time and expense. It would be advantageous if a means were found to keep the $C_{24-28}$ internal olefin sulfonate in solution in the injectable fluid as it is injected.

The invention provides a method of injecting a hydrocarbon recovery composition comprising a $C_{24-28}$ internal olefin sulfonate into a hydrocarbon containing formation which comprises: (a) making a solubilized $C_{24-28}$ internal olefin sulfonate hydrocarbon recovery composition fluid by mixing a major portion of a $C_{24-28}$ internal olefin sulfonate in fresh water or water having a brine salinity of less than about 2 wt % at a temperature of 50° C. or lower and adding to the mixture a minor amount of a solubilizer which comprises a $C_{15-18}$ internal olefin sulfonate or a $C_{19-23}$ internal olefin sulfonate or mixtures thereof; and (b) injecting the solubilized $C_{24-28}$ internal olefin sulfonate hydrocarbon recovery composition into the hydrocarbon containing formation. The weight ratio of the solubilizer to the $C_{24-28}$ internal olefin sulfonate may be from about 10:90 to about 90:10.

EXAMPLES

Example 1

A hydrocarbon recovery composition including a $C_{24-28}$ internal olefin sulfonate (IOS) was prepared and microemulsion tests with crude oil were compared for two crude oils with higher amounts of specific solubility groups and chemical families and two crude oils with lower amounts of specific solubility groups and chemical families. The internal olefin sulfonate was tested as described below.

The $C_{24-28}$ internal olefins were a mixture of odd and even carbon number olefins and had an average carbon number of 26. The C23 olefin was 7% of the total, C24 was 9%, C25 was 10%, C26 was 11%, C27 was 10%, C28 was 10% and C29 was 8%. 50% of the internal olefins had from 24 to 28 carbon atoms.

The $C_{15-18}$ internal olefins were a mixture of odd and even carbon number olefins and had an average carbon number of 16.3. The C14 olefin was 1% of the total, C15 was 25%, C16 was 27%, C17 was 27%, C18 was 20% and C19 was <1%. 96% of the internal olefins had from 15 to 18 carbon atoms.

Oil solubilization at the optimal salinity of the surfactant is measured by microemulsion tests with no indication of undesirable viscous phases and is an important criterion for the effectiveness of a surfactant for enhanced oil recovery. Oil solubilization is defined by solubilization ratio or solubilization parameter and is the ratio of oil to surfactant (and water to surfactant) in a middle phase Winsor Type III microemulsion. It can also be judged in tests with crude oils by the formation of lighter brown, creamy microemulsions for oil/water mixtures, such microemulsions being associated with "high activity" which generally translates into low interfacial tension.

A $C_{24-28}$ internal olefin sulfonate (IOS) was found to give high activity in microemulsion tests with no indication of undesirable viscous phases for crude oils containing higher asphaltene to resin ratios, as well as lower saturate to aromatic ratios. The crude oils which did not perform well in these tests also contain high concentrations of naphthenic acids. It is theorized that these chemical families were responsible for the appearance of macro-emulsion phases. Although termed $C_{24-28}$ IOS, this product contains molecules with a wide range of carbon numbers and this includes up to $C_{36}$. It is theorized that the heavier $C_{24-28}$ IOS components are able to match up with the specific solubility group and chemical family crude oil components. Other IOSs with lower carbon numbers do not show this behavior.

Microemulsion tests with IOS-only formulations containing $C_{24-28}$ IOS as the primary surfactant component have been carried out with several crude oils and at different temperature and salinity conditions. Glass sample tubes containing oil, aqueous IOS solution and air were equilibrated at the test temperature with periodic shaking. Test temperatures were in the range 54-90° C. and an "effective salt concentration" of 1-4% wt ("effective salt concentration" meaning the total of NaCl [or KCl] and $Na_2CO_3$ concentrations). Based on other tests, the effective temperature range of the IOS family is 40-140° C. since the IOS family is temperature stable to the highest practical temperatures for EOR.

In addition, the optimal salinity (the salinity at which equal volumes of brine and oil are solubilized in the middle-phase microemulsion; also, the salinity where highest activity is measured) of IOS formulations containing $C_{24-28}$ IOS shows relatively small changes with temperature. This is a potential benefit for reservoirs with areas of different temperature regions where only slight adjustments to the formulation should be required.

Microemulsions tests with a $C_{24-28}$ IOS formulation and a crude oil with a high asphaltene to resin ratio were carried out to test for optimal salinity. The tests were carried out at 60° C. The initial volumes were 30% v oil and 70% v aqueous solution (of brine+IOS surfactant+polymer).

At 0.5% wt KCl, the system was 2-phase and "under-optimum". Almost all of the surfactant was in the brine phase. At 0.75% wt KCl, more oil was solubilized in the brine phase and a third micro-emulsion phase started to develop at the oil-brine interface. At 1.25% wt KCl, the micro-emulsion volume was maximum and the system was at optimum conditions. This defines the optimal salinity for this system. The emulsion was a pale-brown color which is a good indication of a very active system with an ultra-low IFT. The brine phase was almost clear because most surfactant was then present in the micro-emulsion phase. The IFT should be at a minimum at this salt concentration. At 1.5% wt KCl the system was "over-optimum". All of the surfactant was in the oil phase.

Other tests with model oils showed that $C_{24-28}$ IOS gave very high oil solubilization with dodecane compared with octane, indicating the longer carbon chains of the surfactant are more effectively solvated by the heavier model oil, this being consistent with the result of the paraffinic crude.

Figure 3:
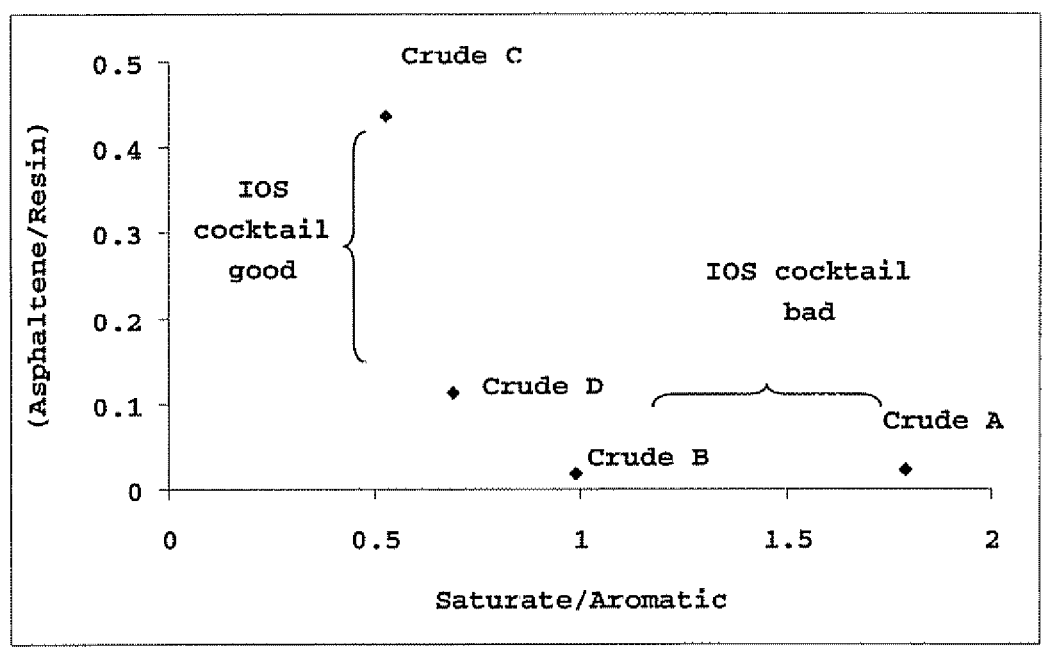
FIG. 3 depicts the effect of crude oil solubility fractions on IOS performance

Five crude oils with different concentrations of specific solubility groups and chemical families were tested for surfactant activity in phase behavior tests. These tests were carried out as described above. The results are shown in Table 1 below. FIG. 3 shows the effect of crude oil solubility fractions on IOS performance.

All of the crude oils were "light oils" according to the API gravity classification. Crude oils A and B had low asphaltene to resin ratio, high saturate to aromatic ratio and high naphthenic acid concentration while oils C and D had high asphaltene to resin ratio, low saturate to aromatic ratio and low naphthenic acid concentration. The surfactant system was a mixture of 0.5% wt $C_{24-28}$ IOS+0.2% wt $C_{15-18}$ IOS+1% wt 2-butanol.

TABLE 1

| Crude | API | TAN | Oil Composition (wt %) | | | | | Optimal salinity | $C_{24-28}$ Surfactant Activity |
| | | | S | A | R | As | NA (ppm) | (% m KCl) | |
| --- | --- | --- | --- | --- | --- | --- | --- | --- | --- |
| A | 38.1 | 0.14 | 59.2 | 33.0 | 7.6 | 0.2 | 3230 | 0.5 | activity seen but with viscous |
| B | 33.1 | 0.19 | 44.4 | 44.8 | 10.5 | 0.2 | 3360 | 0.8 | phases, $C_{24-28}$ IOS poorly |

TABLE 1-continued

| Crude | API | TAN | Oil Composition (wt %) | | | | | Optimal salinity | $C_{24-28}$ Surfactant Activity |
| | | | S | A | R | As | NA (ppm) | (% m KCl) | |
| --- | --- | --- | --- | --- | --- | --- | --- | --- | --- |
| C | 31.3 | 0.04 | 28.6 | 53.9 | 12.2 | 5.3 | 1500 | 1.3 | compatible with oil excellent activity |
| D | 37.3 | 0.03 | 34.1 | 49.3 | 14.9 | 1.7 | 1856 | 1.2 | |
| E | 26.5 | 0.07 | 27.5 | 52.3 | 13.6 | 6.6 | n.m. | 1.3 | | n.m. = not measured

It is clear from these results that the $C_{24-28}$ IOS surfactant is less compatible with the crude oils with lower asphaltene to resin ratios, higher saturate to aromatic ratios and higher naphthenic acid concentration and is more compatible with the crude oils with higher asphaltene to resin ratios, lower saturate to aromatic ratios and lower naphthenic acid concentration.

Example 2

Aqueous solubility tests of $C_{24-28}$ internal olefins at ambient temperature (0.7% wt active concentration of the surfactant in de-ionized water) showed that the solution was hazy with undissolved solids. Above 50° C. all solids were dissolved, although the micellar solution was still hazy. The same test with $C_{24-28}$ internal olefins blended with $C_{15-18}$ internal olefins in a weight ratio 0.5/0.2 gave a nearly clear and homogeneous solution and no undissolved solids at a temperature of 60° C. and above. The presence of co-solvent such as sec-butyl alcohol was found to further improve aqueous solubility and microemulsion behavior.

The microemulsion activity of $C_{24-28}$ internal olefins alone and blended with $C_{15-18}$ internal olefins in a weight ratio 0.7/0.1 was determined at 85° C. The blends contained 1% wt 2-butanol and were added to a 70/30% wt brine/oil mixture. The $C_{24-28}$ internal olefins alone showed reasonable activity—a microemulsion formed at the oil/brine surface. The solubilization parameter at optimal salinity (0.75% wt NaCl and 1% wt $Na_2CO_3$) was 4. The $C_{24-28}$ IOS blend with $C_{15-18}$ IOS showed excellent activity—a relatively large microemulsion volume was formed. The solubilization parameter at optimal salinity (2% wt NaCl and 1% wt $Na_2CO_3$) was 15. Thus, the surfactant activity was also improved by adding the $C_{15-18}$ IOS.

Hydrocarbon recovery compositions including a $C_{20-24}$ internal olefin sulfonate and lower carbon number IOS were prepared and microemulsion tests were compared for the different compositions.

The $C_{20-24}$ internal olefins (made from alpha olefins) were a mixture of only even carbon number olefins and had an average carbon number of 20.7. 4-5% of the total olefins were C18 internal olefins (18 carbon atoms), 59-61% were C20, 29-31% were C22 and 3-8% were C24. 92% of the internal olefins had from 20 to 24 carbon atoms. It was made with a high $SO_3$/olefin ratio.

The $C_{19-23}$ internal olefins (made from alpha olefins) were a mixture of only even carbon number olefins and had an average carbon number of 22. 3% of the total olefins were C18 internal olefins or lower (18 or less carbon atoms), 13% were C19, 15% were C20, 14% were C21, 13% were C22, 11% were C23 and 31% were C24 internal olefins or higher. 66% of the internal olefins had from 19 to 23 carbon atoms.

The $C_{24-28}$ internal olefins alone gave lower microemulsion activity than a blend of $C_{24-28}$ internal olefins with $C_{15-18}$ internal olefins. For example in a test with 0.7% $C_{24-28}$ IOS, the oil and water volatilization at optimum salinity was 4. The same test with a 0.7/0.1% wt $C_{24-28}$/$C_{15-18}$ IOS surfactant mixture resulted in a solubilization of 15.

Use of $C_{20-24}$ internal olefins mixed as a secondary component with $C_{24-28}$ IOS was found to give improved microemulsion behavior but not improved aqueous solubility. The $C_{19-23}$ IOS also gave improved microemulsion behavior (aqueous solubility was not determined). However, the $C_{19-23}$ IOS, due to its branching and wide carbon number distribution, is expected to improve aqueous solubility as well.

Example 3

The $C_{24-28}$ internal olefin sulfonates were tested with alkanes and a crude oil without co-surfactants to further study their behavior. The internal olefin sulfonates were tested at 90° C. for n-octane and n-dodecane; and at 54° C. for the crude oil test. The results of these tests are shown in Table 2.

TABLE 2

| Surfactant | Oil | Activity | Comments |
| --- | --- | --- | --- |
| $C_{24-28}$ IOS | n-octane | High | 2% active surfactant, no solvent |
| $C_{24-28}$ IOS | n-dodecane | High | 2% active surfactant, no solvent |
| $C_{24-28}$ IOS | Crude F | Low | 0.3% active surfactant, 1% DGBE |

The results show that the long-tailed $C_{24-28}$ internal olefin sulfonate has excellent performance with alkanes in the absence of a co-surfactant/solvent. On the other hand, the tests with crude F show that $C_{24-28}$ internal olefin sulfonates are more efficient when used with a solvent and/or co-surfactant.

What is claimed is:

1. A hydrocarbon recovery composition which comprises a first blend of C24-28 internal olefin sulfonates and another internal olefin sulfonate selected from the group consisting of C15-18 internal olefin sulfonates, C19-23 internal olefin sulfonates, C20-24 internal olefin sulfonates and mixtures thereof which are blended with the C24-28 internal olefin sulfonate, and wherein the weight ratio of the C24-28 internal olefin sulfonate to the other internal olefin sulfonates is from about 71:29 to about 90:10.

2. The composition of claim 1 wherein the weight ratio of the C24-28 internal olefin sulfonate to the other internal olefin sulfonates is from about 87.5:12.5 to about 90:10.

3. The composition of claim 1 wherein the first blend has an average carbon number of from 24.5 to 27 and at least 40% by weight of the internal olefin sulfonates in the blend contain from 24 to 28 carbon atoms.

4. The composition of claim 1 wherein the first blend has an average carbon number of from 24.5 to 27 and at least 50% by weight of the internal olefin sulfonates in the blend contain from 24 to 28 carbon atoms.

5. The composition of claim 1 wherein the first blend has an average carbon number of from 24.5 to 27 and at least 60% by weight of the internal olefin sulfonates in the blend contain from 24 to 28 carbon atoms.

6. The composition of claim 1 which also comprises an inorganic salt.

7. The composition of claim 6 wherein the inorganic salt is selected from the group consisting of sodium carbonate, sodium hydroxide, sodium chloride and calcium chloride.

8. The composition of claim 6 wherein the inorganic salt comprises alkali.

9. The composition of claim 8 wherein the alkali is added in an amount of from about 0.1 to 2 wt %.

10. The composition of claim 1 which also comprises a co-surfactant and/or a co-solvent.

11. The composition of claim 10 wherein the co-solvent comprises 2-butanol.

12. The composition of claim 1 which also comprises diethylene glycol monobutyl ether.

13. The composition of claim 12 wherein the diethylene glycol monobutyl ether is present in an amount of 1 wt %.

14. The composition of claim 1 which also comprises another internal olefin sulfonate selected from the group consisting of a second internal olefin sulfonate blend having an average carbon number of from about 16 to about 17 and at least 50% by weight, preferably at least 75% by weight, most preferably at least 90% by weight, of the internal olefin sulfonates in the blend contain from about 15 to about 18 carbon atoms, a third internal olefin sulfonate blend having an average carbon number of from about 21 to about 23 and at least 50% by weight, preferably at least 60% by weight, of the internal olefin sulfonates in the mixture contain from 19 to 23 carbon atoms, a fourth internal olefin sulfonate blend having an average carbon number of from about 20.5 to about 23 and at least 50% by weight, preferably at least about 65% by weight, most preferably at least about 75% by weight, of the internal olefin sulfonates in the blend contain from about 20 to about 24 carbon atoms and mixtures thereof which are blended with the first internal olefin sulfonate blend, and wherein preferably the first internal olefin sulfonate blend comprises at least about 71% by weight of the total internal olefin sulfonates.

15. The composition of claim 14 which also comprises alkali in an amount of from about 0.1 to 2 wt %.

16. An injectable fluid composition comprising the hydrocarbon recovery composition of claim 1, water and/or brine wherein the hydrocarbon recovery composition is present in an amount of from 0.05 to 1.0 wt % of the total injectable fluid composition.

17. The injectable fluid composition of claim 16 wherein the hydrocarbon recovery composition is present in an amount of from 0.1 to 0.8 wt % of the total injectable fluid composition.

18. The injectable fluid composition of claim 16 wherein the water and/or brine has a salinity of less than about 2 wt %.

* * * * *